United States Patent [19]

Perkins

[11] 4,071,018
[45] Jan. 31, 1978

[54] SOLAR HEAT COLLECTOR SYSTEM, PARTS THEREFOR AND METHODS

[75] Inventor: Charles H. Perkins, Newtown Square, Pa.

[73] Assignee: Robertshaw Controls Company, Richmond, Va.

[21] Appl. No.: 718,758

[22] Filed: Aug. 30, 1976

[51] Int. Cl.$^2$ .............................................. F24J 3/02
[52] U.S. Cl. ................................. 126/271; 237/1 A
[58] Field of Search ............... 126/270, 271; 237/1 A; 60/641; 165/14, 18

[56] References Cited

U.S. PATENT DOCUMENTS

| | | | |
|---|---|---|---|
| 3,382,917 | 5/1968 | Rice | 165/39 |
| 3,906,928 | 9/1975 | Wright | 126/271 |
| 3,986,489 | 10/1976 | Schlesinger | 165/271 |

Primary Examiner—Kenneth W. Sprague
Assistant Examiner—James C. Yeung
Attorney, Agent, or Firm—Candor, Candor & Tassone

[57] ABSTRACT

A solar heat collector system having a fluid storage unit that is interconnected to the inlet of a solar heat collector by a pump and is also interconnected to the outlet of the collector by a return. A temperature sensor is operatively interconnected to the pump to turn on the pump when the sensor senses a temperature of a first certain magnitude above the temperature of the fluid in the storage unit and to turn off the pump when the sensor senses a temperature below a second certain magnitude above the temperature of the fluid in the storage unit. An aspirator unit is provided for directing fluid from the return to adjacent the senor to change the temperature thereof.

40 Claims, 1 Drawing Figure

U.S. Patent  Jan. 31, 1978  4,071,018
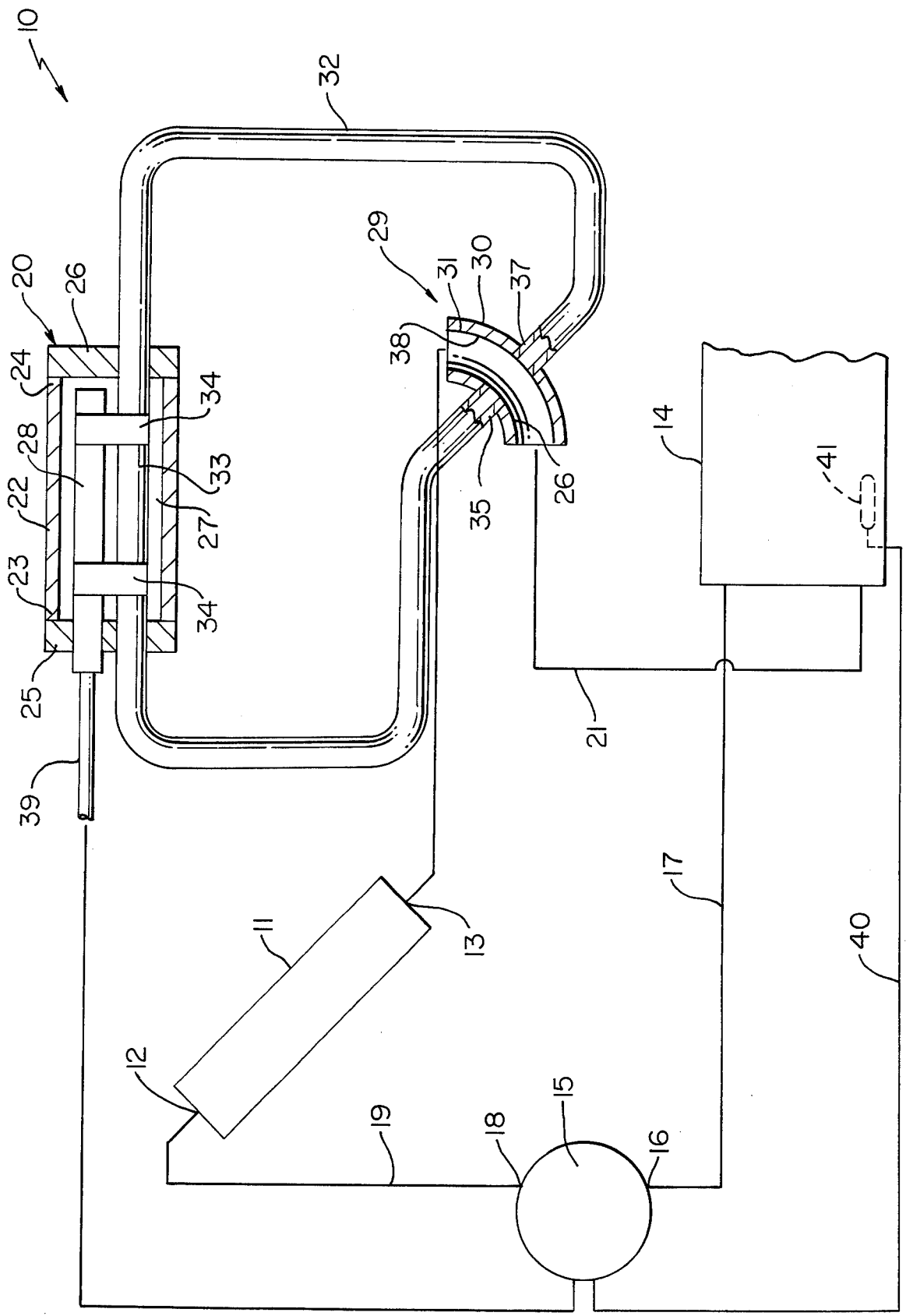

SOLAR HEAT COLLECTOR SYSTEM, PARTS THEREFOR AND METHODS

This invention relates to an improved solar heat collector system and method of operating the same as well as to improved parts for such a system or the like and to methods for making such parts.

It is well known that solar heat collector systems have been provided wherein each has a fluid storage means that is interconnected to the inlet of a solar heat collector by a pump means and is also interconnected to the outlet of the collector by a return means whereby when the pump means is turned on, the pump means delivers fluid from the storage means to the inlet of the collector and the fluid is heated in the collector by solar energy so that by the time the fluid is returned to the storage means by the return means, the temperature of the fluid has been increased in the collector.

It is a feature of this invention to provide improved solar heat collector system and method of operating such a solar heat collector system wherein improved temperature sensing means is provided for operating the pump means thereof.

In particular, one embodiment of this invention provides a solar heat collector system having a fluid storage means that is interconnected to the inlet of a solar heat collector by a pump means and is also interconnected to the outlet of the collector by a return means, a temperature sensor being operatively interconnected to the pump means to turn on the pump means when the sensor senses a temperature above a first certain magnitude above the temperature of the fluid in the storage means and to turn off the pump means when the sensor senses a temperature below a second certain magnitude above the temperature of the fluid in the storage means. Means is provided for directing fluid from the return means to adjacent the sensor to change the temperature thereof and if the collector receives sufficient energy from the sun during an initial purge cycle thereof to heat the fluid to a temperature to a certain magnitude above the temperature of the storage means, the fluid being directed from the return means to adjacent the sensor will not cool the sensor sufficiently to cause the pump means to be turned off. However, if the fluid is not heated sufficiently in the collector, the system will be shut down for another try to start up which will occur when the sun again heats the sensor to the first certain magnitude above the temperature of the fluid in the storage means.

Accordingly, it is an object of this invention to provide an improved solar heat collector system having one or more of the novel features set forth above or hereinafter shown or described.

Another object of this invention is to provide a method of operating such a solar heat collector system, the method of this invention having one or more of the novel features set forth above or hereinafter shown or described.

Another object of this invention is to provide improved parts for such a solar heat collector system, each such part of this invention having one or more of the novel features set forth above or hereinafter shown or described.

Another object of this invention is to provide a method of making each such part, the method of this invention having one or more of the novel features set forth above or hereinafter shown or described.

Other objects, uses and advantages of this invention are apparent from a reading of this description which proceeds with reference to the accompanying drawings wherein:

The single FIGURE of the drawings illustrates the solar heat collector system of this invention in a schematic manner as well as the improved sensor unit and aspirator unit of this invention being utilized in such collector system.

While the various features of this invention are hereinafter illustrated and described as being particularly adapted to provide solar heat collector means utilizing water, it is to be understood that the various features of this invention can be utilized singly or in any combination thereof to provide solar heat collector means for other types of fluid as desired.

Therefore, this invention is not to be limited to only the embodiment illustrated in the drawings, because the drawings are merely utilized to illustrate one of the wide variety of uses of this invention.

Referring now to the single FIGURE of the drawings, the improved solar heat collector system of this invention is generally indicated by the reference numeral 10 and comprises a conventional solar heat collector 11 having an upper inlet end 12 and a lower outlet end 13 down through which a suitable liquid, such as water or the like, will flow by gravity and have the temperature thereof increased as the collector 11 absorbs solar energy radiating thereon from the sun in a conventional manner.

The fluid for the solar heat collector 11 is adapted to be supplied to the inlet 12 thereof from a storage tank or means 14 by a fluid pump 15 that has its inlet 16 interconnected to the storage tank 14 by a conduit means 17 and its outlet 18 interconnected to the inlet 12 of the solar heat collector 11 by a conduit means 19, the pump means 15 being adapted to be turned on only when a temperature sensor unit of this invention that is generally indicated by the reference numeral 20 is sensing a temperature of a first certain magnitude above the temperature of the fluid in the storage tank 14 as will be apparent hereinafter so that when the temperature of the temperature sensing unit 20 falls below a second certain magnitude above the temperature of the fluid in the storage means 14, the pump means 15 is automatically turned off until the temperature sensed by the temperature sensor unit 20 again rises above the first certain magnitude above the temperature of the fluid in the storage means 14 as will be apparent hereinafter.

The outlet 13 of the solar heat collector 11 is interconnected to the storage tank 14 by a return conduit means 21.

The temperature sensor unit 20 of this invention comprises a cylindrical glass tube 22 having its opposed open ends 23 and 24 suitable sealed closed by end closures 25 and 26 whereby a substantially cylindrical chamber 27 is defined within the glass tube 22 and can be evacuated, if desired.

An elongated tubular temperature sensing bulb 28 is disposed within the chamber 27 of the glass tube 22 and has its capillary tube 39 interconnected to the control means (not shown) of the pump means 15 to cooperate with another capillary tube 40 of a temperature sensing bulb 41 that is disposed in the storage tank 14. In particular, the bulb means 28 and 41 cooperate together to operate the pump means 15 in such a manner that the pump means 15 will not be turned on unless the temperature being sensed by the bulb 28 in the sensor unit 20 is above a first certain magnitude above the temperature of the liquid in the storage means 14 being sensed by the bulb 41. For example, in a typical system 10 of this invention wherein the liquid in the storage tank 14 is water, the first certain magnitude can be approximately 15° F. so that the pump means 15 will not be turned on until the temperature sensing bulb 28 is sensing a temperature approximately 15° F. above the temperature of the water in the storage tank 14 for a purpose hereinafter described. The pump means 15 can be so operated than the pump means 15 when once turned on by the temperature sensors 28 and 41 cooperating in the above manner, will not be turned off until the temperature being sensed by the bulb 28 falls below a second certain magnitude above the temperature of the liquid in the storage tank 14 being sensed by the bulb 41 and in the above example, such second certain magnitude can be approximately 5° F. for a purpose hereinafter described.

An aspirator unit of this invention is generally indicated by the reference numeral 29 in the drawings and is utilized in a manner hereinafter described for directing part of the fluid from the return means 21 of the system 10 to adjacent the temperature sensor 28 to change the temperature thereof as will be apparent hereinafter, the aspirator unit 29 comprising an elbow-like fitting 30 having a flow passage 31 passing therethrough and being disposed in the return means 21 to form part of the flow path thereof whereby all of the fluid being directed by the return means 21 from the collector 11 back to the storage tank 14 will flow through the arcuate flow path 31 of the elbow-like fitting 30.

The aspirator unit 29 of this invention also includes a passage defining means or conduit means 32 having a straight tubular portion 33 thereof passing through the chamber 27 of the glass tube 22 to form part of the temperature sensor 20 so that the part 33 of the conduit means 32 is disposed substantially parallel and closely adjacent to the temperature sensing bulb 28. In fact, the part 33 of the aspirator unit 29 can be interconnected to the bulb 28 by thermal fastening means 34 which are adapted to conduct heat between the parts 33 and 28 while providing a thermal lag therebetween, the cross sectional area of the clips or fasteners 34 determining the thermal lag time for a purpose hereinafter described.

The conduit means 32 has one end 35 interconnected to the flow path 31 of the elbow-like fitting 30 at an inner radius 36 thereof while the other end 37 of the conduit means 32 is also interconnected to the flow path 31 of the elbowlike fitting 30 but at the larger radius 38 thereof.

In this manner, fluid flow through the path 31 of the elbow-like fitting 30 will establish a lower pressure at the inner radius 36 and, thus, at the end 35 of the conduit means 32 relative to a higher pressure being established at the outer radius 38 and thus, at the end 37 of the conduit 32 whereby the pressure differential between the ends 35 and 37 of the conduit 32 causes a flow of some of the fluid from the flow path 31, and, thus, from the return means 21 to be directed by the conduit means 32 through the part 33 thereof and, thus, adjacent the sensor 28 to change the temperature thereof as will be apparent hereinafter.

The bulb 28 of the temperature sensor 20 can be blackened to facilitate its ability to absorb solar radiation passing through the glass tube 22 while the part 33 of the flow tube 32 can be polished to reflect such radiation away from the same.

Also, the elbow-like fitting 31 should be located as close as possible to the outlet 13 of the solar collector 11.

Therefore, it can be seen that the temperature sensor unit 20 of this invention can be made from relatively few parts according to one method of this invention and the aspirator unit 29 can be made from relatively few parts according to another method of this invention, the resulting temperature sensing unit 20 and aspirator unit 29 being adapted to be utilized in the solar heat collector system 10 of this invention which is adapted to operate according to a method of this invention in a manner now to be described.

Assuming that it is night time so that the pump means 15 is in an off condition thereof because the temperature being sensed by the bulb 28 of the temperature sensor unit 20 is obviously below the temperature of the liquid in the storage tank means 14.

However, upon the initial rising of the early morning sun, the rays of the sun will initially heat the temperature bulb 28 of the sensor unit 20 to a temperature above a first certain magnitude above the temperature of the liquid in the storage means 15, such as approximately 15° F. above the temperature of the liquid in the storage unit 14. At this time, the temperature sensor 28 in combination with the bulb 41 turns on the pump means 15 which causes liquid to be passed from the inlet 12 of the collector 11 down the same to the outlet 13 thereof and, thus, through the return means 31 to the storage tank 14. However, the flow of liquid through return means 21 causes the aspirator unit 29 to operate so that a portion of the liquid from the return means 21 is passed through the part 33 of the conduit means 32 and, thus, adjacent the temperature sensing bulb 28 to change the temperature thereof. Thus, if the collector water temperature upon initial startup is below the temperature of the liquid in the storage unit 14, the aspirated flow of liquid through the part 33 of the conduit 32 will slowly cool the sensor 28 to within the turnoff differential of the pump means 15 and will shut off the same. For example, should the temperature of the bulb 28 fall below approximately 5° F. above the temperature of the liquid in the storage tank 14, the pump means 15 will be turned off in the aforementioned typical example of the system 10.

It is believed that the ratio of aspirated flow of fluid through the conduit means 32 to total flow of fluid through the return means 21 and the thermal time delay caused by the heat transfer clips 34 in the temperature sensor unit 20 can be so selected and set that the initial purge of all of the fluid from the solar collector 11 will be completed even though the pump means 15 is subsequently turned off because the temperature sensing unit 20 is not receiving sufficient solar energy from the sun.

However, if the collector 11 is receiving sufficient energy from the sun during the initial purge cycle described above so as to heat the water passing therethrough to a temperature at least 5° F. above the storage tank temperature, the aspirated flow through the part 33 of the conduit 32 will not cool the temperature sensing bulb 28 sufficiently to cause the pump 15 to turn off whereby the pump 15 will continuously operate to circulate the liquid from the storage means 14 through the collector 11 to have the temperature thereof increased in a conventional manner as the rays of the sun fall on the collector 11.

However, if the collector 11 does not receive sufficient energy from the sun so that the temperature sensing bulb 28 is sensing a temperature below the second certain magnitude above the temperature of the liquid in the storage means 14, the system 10 then would be shut down by the pump 15 being turned off for another try of start up which will occur when the sun again heats the collector sensor 20 to the first certain magnitude thereof which in the above example is approximately 15° F. above the storage tank temperature.

It is believed that an initial cycle of operation of the pump means 15 in the above manner will replace cool collector water with warm storage water so that it is estimated that a maximum of two trys to start the system 10 by the sensor unit 20 is all that would be required in the worst case of initial start up after an extremely cold night shut down for the system 10 to be continuously operating thereafter.

Therefore, it can be seen that this invention not only provides an improved solar heat collector system and method of operating the same, but also this invention provides an improved temperature sensing unit and an improved aspirator unit and methods of making such units.

While the forms and methods of this invention have been illustrated and described as required by the Patent Statute, it is to be understood that other forms and method steps can be utilized and still fall within the scope of the appended claims.

What is claimed is:

1. In a solar heat collector system having a solar heat collector provided with an inlet and an outlet, a pump means, a return means, and a fluid storage means that is interconnected to said inlet of said solar heat collector by said pump means and is also interconnected to said outlet of said collector by said return means, the improvement comprising the combination of a temperature sensor operatively interconnected to said pump means to turn on said pump means when said sensor senses a temperature above a first certain magnitude above the temperature of the fluid in said storage means and to turn off said pump means when said sensor senses a temperature below a second certain magnitude above the temperature of said fluid in said storage means, and means for directing fluid from said return means to adjacent said sensor to change the temperature thereof.

2. A system as set forth in claim 1 wherein said means for directing fluid from said return means to adjacent said sensor comprises an aspirator unit.

3. A system as set forth in claim 2 wherein said aspirator unit comprises an elbow-like fitting forming part of said return means and through which said fluid flows from said outlet of said collector to said storage means.

4. A system as set forth in claim 3 wherein said elbow-like fitting has an outer radius and an inner radius, said means for directing fluid from said return means to adjacent said sensor comprising a passage defining means having an inlet interconnected to said outer radius of said elbow-like fitting and having an outlet interconnected to said inner radius of said elbow-like fitting.

5. A system as set forth in claim 4 wherein said passage defining means comprises a conduit means having a portion thereof disposed adjacent said sensor.

6. A system as set forth in claim 1 wherein said sensor comprises an evacuated container means that is at least partially transparent and containing said sensor and part of said means for directing fluid from said return means to adjacent said sensor.

7. A system as set forth in claim 6 wherein said sensor is blackened to absorb radiation passing through said container means.

8. A system as set forth in claim 6 wherein said part of said means for directing fluid from said return means to adjacent said sensor comprises a fluid flow tube disposed adjacent said sensor inside said container means.

9. A system as set forth in claim 8 wherein said fluid flow tube is interconnected to said sensor by heat transfer means that provide a thermal lag between said fluid flow tube and said sensor.

10. A system as set forth in claim 9 wherein said sensor is blackened to absorb radiation passing through said container means, said fluid flow tube being polished to reflect said radiation therefrom.

11. In a method of operating a solar heat collector system having a fluid storage means that is interconnected to the inlet of a solar heat collector by a pump means and is also interconnected to the outlet of the collector by a return means, the improvement comprising the steps of operatively interconnecting a temperature sensor to said pump means to turn on said pump means when said sensor senses a temperature above a first certain magnitude above the temperature of the fluid in said storage means and to turn off said pump means when said sensor senses a temperature below a second certain magnitude above the temperature of said fluid in said storage means, and directing fluid from said return means to adjacent said sensor with directing means to change the temperature thereof.

12. A method as set forth in claim 11 and including the step of forming said directing means for directing fluid from said return means to adjacent said sensor from an aspirator unit.

13. A method as set forth in claim 12 and including the step of forming said aspirator unit from an elbow-like fitting to form part of said return means and through which said fluid flows from said outlet of said collector to said storage means.

14. A method as set forth in claim 13 and including the steps of forming said directing means for directing fluid from said return means to adjacent said sensor from a passage defining means, interconnecting an inlet of said passage defining means to an outer radius of said elbow-like fitting, and interconnecting an outlet of said passage defining means to an inner radius of said elbow-like fitting.

15. A method as set forth in claim 14 and including the step of forming said passage defining means from a conduit means having a portion thereof disposed adjacent said sensor.

16. A method as set forth in claim 11 and including the steps of forming said sensor from an evacuated container means that is at least partially transparent, and disposing said temperature sensor and part of said directing means in said container means.

17. A method as set forth in claim 16 and including the step of blackening said temperature sensor to cause the same to absorb radiation passing through said container means.

18. A method as set forth in claim 16 and including the step of forming said part of said directing means for directing fluid from said return means to adjacent said sensor from a fluid flow tube disposed adjacent said sensor inside said container means.

19. A method as set forth in claim 18 and including the step of interconnecting said fluid flow tube to said sensor by heat transfer means that provide a thermal lag between said fluid flow tube and said sensor.

20. A method as set forth in claim 19 and including the steps of blackening said sensor to absorb radiation passing through said container means, and polishing said fluid flow tube to reflect said radiation therefrom.

21. A sensor unit for a solar heat collector system having a solar heat collector provided with an inlet and an outlet, a pump means and a return means, said unit comprising a container means that is at least partially transparent, a temperature sensor disposed in said container means for operating said pump means of said system in relation to temperature sensed by said sensor, and means for directing fluid from said return means of said solar heat collector, said means having a part disposed in said container means adjacent said temperature sensor to change the temperature thereof.

22. A sensor unit as set forth in clam 21 wherein said temperature sensor is blackened to absorb radiation passing through said container means.

23. A sensor unit as set forth in claim 21 wherein said part of said means for directing fluid from said return means to adjacent said temperature sensor comprising a fluid flow tube disposed adjacent said temperature sensor inside said container means.

24. A sensor unit as set forth in claim 23 wherein said fluid flow tube is interconnected to said temperature sensor by heat transfer means that provide a thermal lag between said fluid flow tube and said sensor.

25. A sensor unit as set forth in claim 24 wherein said temperature sensor is blackened to absorb radiation passing through said container means, said fluid flow tube being polished to reflect said radiation therefrom.

26. A sensor unit as set forth in claim 24 wherein said container means has a longitudinal axis, said temperature sensor having a longitudinal axis, said fluid flow tube having a longitudinal axis, all of said axes being substantially parallel with each other.

27. A method of making a sensor unit for a solar heat collector system comprising the steps of providing a container means that is at least partially transparent, disposing a temperature sensor inside said container means for operating a collector pump of said system in relation to temperature sensed by said sensor, and disposing a part of a means for directing fluid from a return means of a solar heat collector inside said container means adjacent said temperature sensor to change the temperature thereof.

28. A method as set forth in claim 27 and including the step of blackening said temperature sensor to absorb radiation passing through said container means.

29. A method as set forth in claim 27 and including the step of forming said part of said means for directing fluid from said return means to adjacent said temperature sensor from a fluid flow tube that is to be disposed adjacent said temperature sensor inside said container means.

30. A method as set forth in claim 29 and including the step of interconnecting said fluid flow tube to said temperature sensor by heat transfer means that provide a thermal lag between said fluid flow tube and said sensor.

31. A method as set forth in claim 30 and including the steps of blackening said temperature sensor to absorb radiation passing through said container means, and polishing said fluid flow tube to reflect said radiation therefrom.

32. A method as set forth in claim 30 and including the step of disposing all of the longitudinal axes of said container means, said tube and said sensor so as to all be substantially parallel with each other.

33. An aspirator unit for a solar heat collector system having a solar collector provided with an inlet and an outlet, a return means, a pump means interconnected to said inlet and by said return means to said outlet, and a temperature sensor to operate said pump means, said unit comprising directing means for directing fluid from said return means of said solar heat collector adjacent said temperature sensor of said system to change the temperature thereof, said directing means having an aspirator means therein adapted to be responsive to fluid flow through said return means to cause some of said fluid in said return means to flow through said directing means.

34. An aspirator unit as set forth in claim 33 wherein said aspirator means comprises an elbow-like fitting adapted to form part of said return means and through which said fluid is adapted to flow from said collector.

35. An aspirator unit as set forth in claim 34 wherein said elbow-like fitting has an outer radius and an inner radius, said directing means comprising a passage defining means having an inlet interconnected to said outer radius of said elbow-like fitting and having an outlet interconnected to said inner radius of said elbow-like fitting.

36. An aspirator unit as set forth in claim 35 wherein said passage defining means comprises a conduit means having a portion thereof that is adapted to be disposed adjacent said temperature sensor of said system.

37. A method of making an aspirator unit for a solar heat collector system comprising the steps of providing directing means for directing fluid from a return means of a solar heat collector adjacent a temperature sensor of said system to change the temperature thereof, and forming said directing means with an aspirator means therein adapted to be responsive to fluid flow through said return means to cause some of said fluid in said return means to flow through said directing means.

38. A method as set forth in claim 37 and including the step of forming said aspirator means from an elbow-like fitting adapted to form part of said return means and through which said fluid is adapted to flow from said collector.

39. A method as set forth in claim 38 and including the steps of forming said directing means from a passage defining means, interconnecting an inlet of said passage defining means to an outer radius of said elbow-like fitting, and interconnecting an outlet of said passage defining means to an inner radius of said elbow-like fitting.

40. A method as set forth in claim 39 and including the step of forming said passage defining means from a conduit means having a portion thereof that is adapted to be disposed adjacent said temperature sensor of said system.

* * * * *